(12) United States Patent
Deng et al.

(10) Patent No.: US 7,689,198 B2
(45) Date of Patent: Mar. 30, 2010

(54) ON-VEHICLE AUDIO/VIDEO SYSTEMS

(75) Inventors: Guoshun Deng, Shenzhen (CN); Guangming Huang, Shenzhen (CN)

(73) Assignee: Netac Technology Co., Ltd., Shenzen, Guangdong Province (CN)

( * ) Notice: Subject to any disclaimer, the term of this patent is extended or adjusted under 35 U.S.C. 154(b) by 662 days.

(21) Appl. No.: 10/599,012

(22) PCT Filed: Mar. 30, 2005

(86) PCT No.: PCT/CN2005/000413

§ 371 (c)(1),
(2), (4) Date: Sep. 18, 2006

(87) PCT Pub. No.: WO2005/096310

PCT Pub. Date: Oct. 13, 2005

(65) Prior Publication Data

US 2007/0197187 A1    Aug. 23, 2007

(30) Foreign Application Priority Data

Mar. 31, 2004   (CN) ........................ 2004 1 0030511

(51) Int. Cl.
H04B 1/06 (2006.01)
H05K 11/02 (2006.01)
(52) U.S. Cl. ................. 455/345; 455/152.1; 455/575.9; 455/569.2; 381/302; 381/23; 340/426.16
(58) Field of Classification Search ................ 455/344, 455/345, 151.2, 152.1, 352, 355, 575.9, 569.2, 455/557, 3.06; 381/105, 86, 56, 119, 302; 381/23, 311; 340/426.13, 426.16, 426.31
See application file for complete search history.

(56) References Cited

U.S. PATENT DOCUMENTS 5,721,541 A    2/1998    Repp et al.

(Continued)

FOREIGN PATENT DOCUMENTS

CN    2552269 Y    5/2003

(Continued)

OTHER PUBLICATIONS

Supplementary European Search Report, Application No. EP 05733338.7, dated Apr. 17, 2008.

(Continued)

*Primary Examiner*—Sujatha Sharma
(74) *Attorney, Agent, or Firm*—Ping Wang; Morris, Manning & Martin, LLP

(57) ABSTRACT

An on-vehicle audio/video system is provided which comprises a controller, a data source and a playing device, wherein the controller comprises at least a first transmitter, and the data source comprises at least a first receiver, a first micro-controller and a second transmitter. The controller comprises at least a first RF transmitter. The data source comprises at least a first RF receiver, a first micro-controller and a second RF transmitter. The playing device comprises at least a second RF receiver. The controller sends an RF control signal to the data source and/or playing device. The first RF receiver in the data source receives the RF control signal and sends the signal to the first micro-controller for processing. The second transmitter transmits data signal and/or control signal to the playing device under the control of the first micro-controller.

18 Claims, 2 Drawing Sheets

U.S. PATENT DOCUMENTS

| | | | |
|---|---|---|---|
| 5,847,664 A | 12/1998 | Zamplas et al. | |
| 6,225,578 B1 * | 5/2001 | Kobayashi et al. | 200/5 R |
| 6,626,062 B1 * | 9/2003 | Yoshitake et al. | 74/552 |
| 7,031,477 B1 * | 4/2006 | Mella et al. | 381/86 |
| 2003/0007649 A1 | 1/2003 | Riggs | |
| 2003/0076968 A1 | 4/2003 | Rast | |
| 2005/0089177 A1 * | 4/2005 | Hughes et al. | 381/86 |
| 2005/0239434 A1 * | 10/2005 | Marlowe | 455/345 |
| 2005/0281414 A1 * | 12/2005 | Simon et al. | 381/86 |

FOREIGN PATENT DOCUMENTS

| | | |
|---|---|---|
| DE | 10004965 A1 | 8/2001 |
| JP | 8-130486 A | 5/1996 |
| JP | 10-283722 A | 10/1998 |
| JP | 2001-239897 A | 9/2001 |
| JP | 2001-239897 A | 9/2001 |
| JP | 2005001624 * | 1/2005 |

OTHER PUBLICATIONS

European Search Opinion dated Mar. 26, 2009 (Corresponding EP Application No. 05 733 338.7).

* cited by examiner

ON-VEHICLE AUDIO/VIDEO SYSTEMS

TECHNICAL FIELD OF THE INVENTION

The present invention relates to an audio/video system, and particularly to an on-vehicle audio/video system.

BACKGROUND OF THE INVENTION

On-vehicle audio/video devices have become popular due to the recreation and entertainment properties themselves. Most of vehicles are equipped with on-vehicle audio/video systems comprising radio and video devices, etc. A conventional on-vehicle audio/video system generally comprises a controller, a data source and a playing device, all of which are coupled to each other by cables. The controller comprises a key panel, a signal generator, an encoder and a cable transmitter for controlling the data source and the playing device through cables. The data source comprises a cable receiver, a decoder, a micro-controller, a memory device, an encoder and a cable transmitter. The playing device comprises a cable receiver, a decoder, a micro-controller and a player. The operation of the known system is briefly illustrated as below. Once a key of the key panel is pressed, the signal generator generates a signal. The signal is encoded by the encoder and then transmitted via the cable transmitter to the data source and the playing device for decoding and sending to respective micro-processors. Thus, the data source and playing device can be controlled to implement corresponding functions. However, due to the cable-connections, it is not quite convenient to execute the required operations. The flexibility of installation of the system is also limited by the cable-connections. Moreover, since control panels are normally provided at the right side of steering wheels, drivers, who customarily steer their cars by using both hands, have to move one hand away from steer-wheels to operate the control panels, which is not only inconvenient for drivers' operation, but also liable to cause accidents.

In view of the above, an on-vehicle audio/video system is hereby provided for the ease of operation.

SUMMARY OF THE INVENTION

An object of the invention is to provide an on-vehicle audio/video system which is convenient for operation.

To achieve the object, an on-vehicle audio/video system according to an embodiment of the invention comprises a controller, a data source and a playing device, wherein the controller comprises at least a first radio frequency (RF) transmitter, the data source comprises at least a first RF receiver, a first micro-controller and a second transmitter. The controller transmits an RF control signal to the data source. The first RF receiver of the data source receives the RF control signal and forwards the received signal to the first micro-controller for processing the signal. The second transmitter transmits data signals and/or control signals to the playing device under the control of the first micro-controller.

Furthermore, in order to achieve the above object, an on-vehicle audio/video system according to another embodiment of the invention comprises a controller, a data source and a playing device, wherein the controller controls the data source and/or the playing device by means of an RF transmission, and the data source transmits data signals and/or control signals to the playing device through an RF transmission.

It is preferable that the controller is provided at the steer wheel.

Compared with conventional cabled on-vehicle audio/video systems, on-vehicle audio/video system of the invention controls the data source and/or the playing device through RF transmission to eliminate inconvenience caused by mounting a cabled on-vehicle audio/video system and provides a flexibility in installation of various devices of the system.

Furthermore, installation of a controller on the steer wheel facilitates drivers' operation, without distracting drivers from driving.

DETAILED DESCRIPTION OF THE INVENTION

Figure 1:
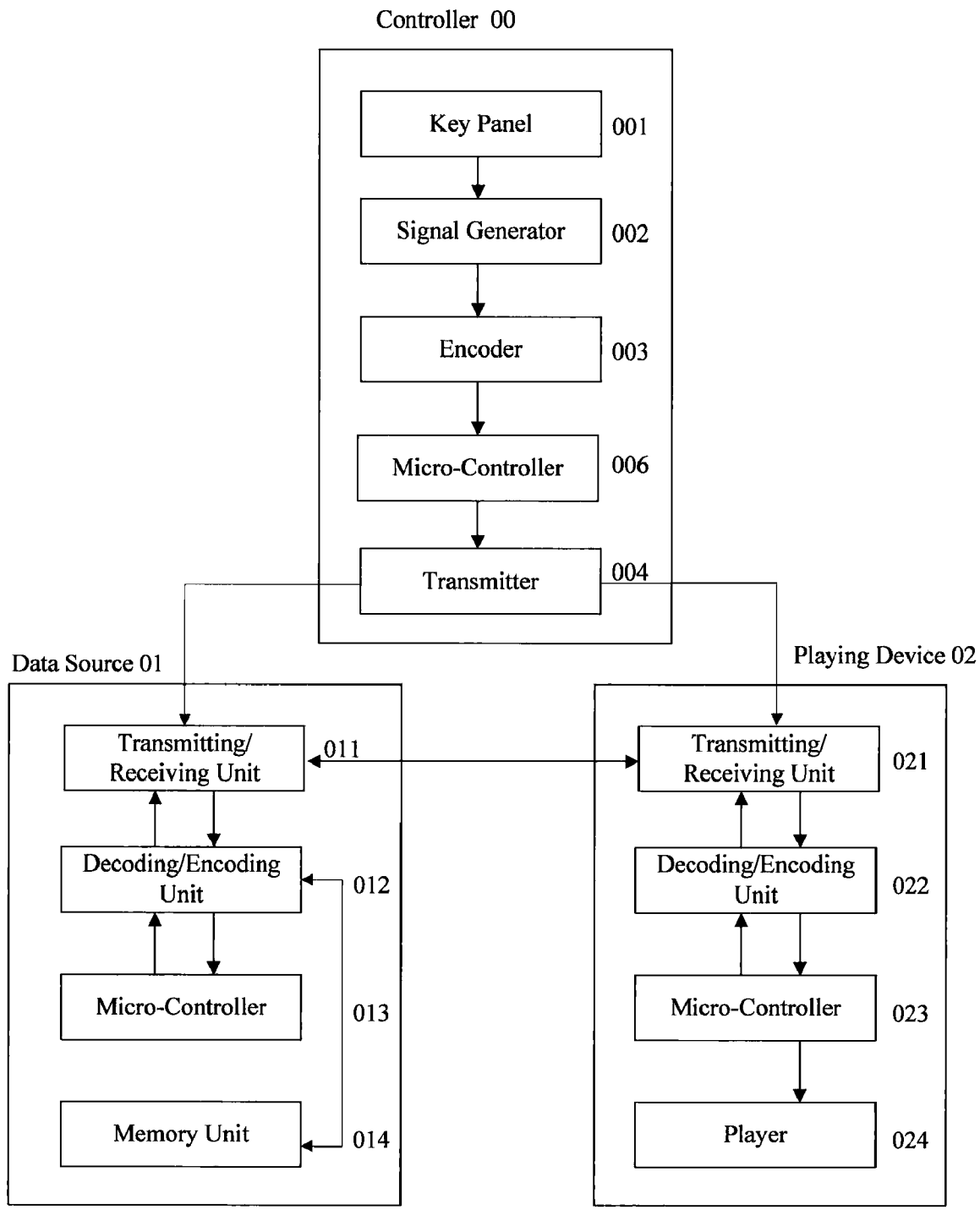
FIG. 1 is a schematic view illustrating the wireless control among a controller, a data source and a playing device in an on-vehicle audio/video system according to the present invention.

Referring to FIG. 1, which illustrates the function block of an on-vehicle audio/video system according to the present invention, the system comprises a controller 00, a data source 01 and a playing device 02. The controller 00 is mounted to a steer wheel to control the data source 01 via an RF transmission in order to implement functions of the audio/video system of the invention, such as On/Off, or the like.

The controller 00 may be powered by a separate power supply, or may be supplied with power from vehicles. The controller may comprise a key panel 001, a signal generator 002, an encoder 003, a first micro-controller 006 and an RF transmitter 004. The key panel 001 is mounted on the steel wheel to facilitate the driver's operation and provided with a plurality of keys for executing various functions. In this embodiment, the key panel 001 is provided with a wake-up key (ON), a sleep-mode key (OFF), a play-mode key (PLAY), a pause-mode key (STILL) and a stop-mode key (STOP), etc. When any of the keys in the key panel 001 is pressed, the signal generator 002 of the controller 00 will generate a corresponding signal. The generated signal is encoded by the encoder 003 and then output to the first micro-controller 006. The first micro-controller 006 processes the signal to control the controller 00 and the transmitter 004. The transmitter 004 produces a corresponding signal under the control of the first micro-controller 006 and transmits the produced signal to the data source 01 or the playing device 02.

The data source 01 comprises at least the following components: a first transmitting/receiving unit 011, a first decoding/encoding unit 012, a second micro-controller 013, and a memory unit 014. The first transmitting/receiving unit 011 which may be an RF transmitting/receiving unit in this embodiment comprises a receiver and a transmitter. The first decoding/encoding unit 012 and the second micro-controller 013 may be integrated in one single controlling chip if necessary. The data source 01 of the on-vehicle audio/video system of the invention may be a cabled-source or an RF-source. The data source 01 may be fixed on a vehicle or be a portable one, comprising one or more of CD devices, VCD devices, DVD devices, EVD devices, hard disks, portable hard disks, semiconductor memory disks (such as flash memory disk), etc. The stored data can be audio or video data. The data source in this embodiment is a portable data source. When the controller 01 sends a signal to the data source 01, the first transmitting/receiving unit 011 of the data source 01 receives the signal from the signal transmitter 004 of the controller 00, and then sends the received signal to the first decoding/encoding unit 012 for decoding. The decoded signal is transferred to the second micro-controller 013 which processes the received signal so as to control the data source 01 and/or the first decoding/encoding unit 012. The first decoding/encoding unit 012 encodes the control signal and sends the encoded control signal to the memory unit 014. The memory unit 014 sends out data signals to the first decoding/encoding unit 012 according to the received control signal. The first decoding/encoding unit 012 encodes the control signal from the second micro-controller 013 and the received data signals, and sends the encoded signals to the transmitter of the first transmitting/receiving unit 011.

The data source 01 can be a data source using its own power supply such as a battery, or a data source which is powered by the power supply of a vehicle.

The playing device 02 can be an audio player such as a speaker or a vehicle audio playing system, or an audio/video player comprising various displayers like a television. The playing device 02 of the on-vehicle audio/video system of the invention can be a cable-controlled playing device incorporated into or separated from the data source 01. In this case, the transmitter of the data source 01 should be a cable transmitter so that signals and data can be transmitted via a cable. The playing device 02 can also be an RF-controlled playing device incorporated into or separated from the data source 01, such as a multimedia player or a radio player equipped on vehicles.

In this embodiment, the playing device 02 is separated from the data source 01 and conducts RF communication with the data source. The playing device 02 comprises at least the following components: a second transmitting/receiving unit 021, a second decoding/encoding unit 022, a third micro-controller 023, and a player 024. The second transmitting/receiving unit 021 comprises a transmitter and a receiver. The second decoding/encoding unit 022 comprises a decoder and an encoder. In this embodiment, the second transmitting/receiving unit 021 is an RF transmitting/receiving unit. The receiver in the second transmitting/receiving unit 021 receives an RF control signal transmitted from the transmitter 004 of the controller 00, or receives data signals or an RF control signal transmitted from the transmitter in the first transmitting/receiving unit 011 of the data source 01. All the RF control signal and the data signals are transmitted to the third micro-controller 023 after being decoded by the decoder in the second decoding/encoding unit 022 of the playing device 02. The third micro-controller 023 processes the received signals in order to control the playing device 02 and/or the player 024. It is understandable that the second decoding/encoding unit 022 and the third micro-controller 023 can be integrated into one chip.

The playing device 02 sends the control signal received from the controller 00 to the first transmitting/receiving unit 011 of the data source 01 through the second transmitting/receiving unit 021. Specifically, the second micro-controller 013 of the data source 01 processes the RF control signal received from the controller 00 so as to control the data source 01 to send corresponding data signals and /or controlling commands to the playing device 02. The third micro-controller 023 of the playing device 02 processes the data signals and/or controlling commands from the data source 01 to control the playing device 02 to produce a control instruction corresponding to the controller 00.

It is understandable for those skilled in the art that the playing device of the invention can receive the control signal from the controller through a receiver of the second transmitting/receiving unit 021 provided in the playing device, and directly get data signals from the data source under the control of the micro-controller of the playing device.

A control method in the on-vehicle audio/video system of the invention is implemented through an RF transmission, comprising the steps of:

1. the key panel 001 of the controller 00 receiving an external instruction, which is generated by pressing a function key in the key panel 001;
2. the signal generator 002 in the controller 00 generating a corresponding control signal;
3. the encoder 003 in the controller 00 encoding the received control signal and then transmits the encoded signal to the first micro-controller 006;
4. the first micro-controller 006 processing the received encoded control signal to control the controller 00 and/or transmitter 004;
5. the transmitter 004 transmitting an RF control signal;
6. the first transmitting/receiving unit 011 in the data source 01 receiving the RF signal from the controller 00 and the first decoding/encoding unit 012 decoding the RF signal and transmitting the decoded signal to the second micro-controller 013 in the data source 01;
7. the second micro-controller 013 processing the received signal and generating a corresponding controlling command for the data source 01 and/or the first decoding/encoding unit 012;
8. the first decoding/encoding unit 012 encoding the command received from the second micro-controller 013, and sending the decoded one to the memory unit 014;
9. the memory unit 014 transmitting corresponding data signals to the first decoding/encoding unit 012;
10. the first decoding/encoding unit 012 encoding/decoding the received data signals and/or the control signal and transmitting them/it to the first transmitting/receiving unit 011;
11. the playing device 02 being controlled in such a way that the second transmitting/receiving unit 021 in the playing device 02 receives an RF control signal from the controller 00 and data signals and/or an RF control signal from the data source 01, and the second decoding/encoding unit 022 processes (e.g., decodes) the received signals and outputs the processed signals to the third micro-controller 023; and
12. the third micro-controller 023 processing the received signals and produces a corresponding controlling command for the playing device 02 and/or player 024.

It is understandable that the playing device 02 of the invention can be cable-controlled in such a way that the second micro-controller 013 of the data source 01 conducts a corresponding processing according to the RF control signal transmitted from the controller 00, so as to control the data source 01 to send out a control signal and/or data signals to the playing device 02 via a cable. The third micro-controller 023 in the playing device 02 processes the received the control signal and/or data signals, and then controls the playing device 02 to produce a corresponding controlling command.

A method for operating and controlling through an RF transmission the controller 00, the data source 01 and the playing device 02 will be described in the following exemplified embodiments.

If a driver wants to awake the on-vehicle audio/video system in a sleeping mode, he presses a wake-up key in the key panel 001 of the controller 00 which is mounted on the steel wheel. The signal generator 002 in the controller 00 produces a corresponding control signal. The encoder 003 encodes the control signal. The encoded control signal is transmitted to the first micro-controller 006 and is processed therein in order to control the controller 00 and/or transmitter 004. The transmitter 004 sends out the control signal from the micro-controller 006 in any one of RF transmissions like Bluetooth, RF communication standard (ZIGBEE), ultra-wideband (UWB), and the like.

The first transmitting/receiving unit 011 in the data source 01 receives the RF wake-up signal from the controller 00 and transmits the signal to the first decoding/encoding unit 012. The signal is decoded by the first decoding/encoding unit 012 and the decoded signal is transmitted to the second micro-controller 013 so that the second micro-controller 013 conducts processing according to the signal to execute the wake-up operation of the data source 01 no matter whether the data source 01 is powered on or not.

The second transmitting/receiving unit 021 of the playing device 02 receives the RF wake-up signal from the controller 00, and sends the signal to the second decoding/encoding unit 022 for decoding. The signal decoded by the second decoding/encoding unit 022 is sent to the third micro-controller 023 so that the third micro-controller 023 conducts processing according to the decoded signal to execute a wake-up operation of the playing device 02, that is, to turn on the data source 01.

After the wake-up key in the key panel 001 of the controller 00 is pressed, the controller 00 wirelessly controls the data source 01 and playing device 02 and enable them to enter the wake-up state. In this state, when the driver presses the playing key in the key panel 001, the signal generator 002 in the controller 00 produces a corresponding playing signal. The produced playing signal is encoded by the encoder 003 into RF codes to be sent to the data source 01 and playing device 02 in an RF transmission manner like Bluetooth, ZIGBEE, UWB, etc.

The first transmitting/receiving unit 011 of the data source 01 receives the RF playing signal from the controller 00, and sends the playing signal to the first decoding/encoding unit 012 for decoding. The decoded playing signal is processed by the second micro-controller 013 in the data source 01. The second micro-controller 013 sends out the address signal and control signal which are obtained through the above processing to the first decoding/encoding unit 012 for encoding. The first decoding/encoding unit 012 sends the encoded signals to the memory unit 014. If it is defaulted that the first song will be played according to the playing signal, the memory unit 014 transmits corresponding data signals to the first decoding/encoding unit 012 according to the received signals. The first decoding/encoding unit 012 encodes the control instruction signal transmitted from the second micro-controller 013 and data signals transmitted from the memory unit 014. Finally, the encoded data signals and control signal are wirelessly transmitted through the first transmitting/receiving unit 011 to the playing device 02. The playing device 02 in this embodiment is separated from the data source 01 and is controlled via an RF transmission. Therefore, the data source 01 can transmit signals to the playing device 02 by an RF transmission such as Bluetooth, ZIGBEE, or UWB, etc.

The second transmitting/receiving unit 021 of the playing device 02 receives the RF data signals and RF control signals. The received signals are decoded by the second decoding/encoding unit 022 and the decoded signals are transmitted to the third micro-controller 023. The third micro-controller 023 converts the digital data signals to analogue signals and then transmits the D/A converted signals to the player 024 for audio-playing or A/V-playing. If the data source 01 transmits image data, the image data are directly sent to the player 024 for displaying, without D/A conversion.

If the memory unit 014 is a video compact disc (V-CD), and the player 024 is a television, the data stream signals and other control signals stored in the V-CD disc in real time video code (MPEG-I) format are encoded by the first decoding/encoding unit 012 of the data source 01, and the encoded signals are sent to the third micro-controller 023 in the playing device 02 through an RF transmission. The third micro-controller 023 processes the signals by dividing them into MPEG-I audio stream which is decoded by the third micro-controller 023 to obtain stereo audio signals for outputting to the television, and MPEG-I video stream which is decoded, D/A converted and NTSC/PAL encoded to form composite video signals for the television. The MPEG-I video stream may also be output as tricolor (RGB) signals to a monitor without the NTS/PAL encoding.

When the pause key in the key panel 001 is pressed, the controller 01 will send out an RF pause signal. The principles of generation of the signal and the control operations are the same as those when the wake-up key or the playing key is pressed.

The first transmitting/receiving unit 011 of the data source 01 receives an RF pause signal transmitted from the controller 00, and sends the signal to the first decoding/encoding unit 012. The unit 012 decodes the signal and transmits the decoded signal to the second micro-controller 013 for processing in implementing the pause operation of the data source 01.

The second transmitting/receiving unit 021 of the playing device 02, upon receiving the RF pause signal, transmits the signal to the second decoding/encoding unit 022 to have the signal decoded therein. The decoded signal is then processed by the third micro-controller 023 to thereby implement the pause operation of the playing device 02.

When the stopping key in the key panel 001 is pressed, the controller 01 will send out an RF stopping signal. The principles of generation of the signal and control operations in this case are the same as those when the wake-up key or playing key is pressed.

The first transmitting/receiving unit 011 of the data source 01 receives an RF stop signal transmitted from the controller 00, and sends the signal to the first decoding/encoding unit 012. The unit 012 decodes the signal and transmits the decoded signal to the second micro-controller 013 for processing so as to implement the stopping operation for the data source 01.

The second transmitting/receiving unit 021 of the playing device 02, upon receiving the RF stop signal, transmits the signal to the second decoding/encoding unit 022 to have the signal decoded therein. The decoded signal is then processed by the third micro-controller 023 to thereby stop the operation of the playing device 02.

When the sleeping key in the key panel 001 is pressed, the controller 01 will send out an RF sleeping signal. The principles of generation of the signal and control operations are the same as those when the function keys such as wake-up key or playing key is pressed.

The first transmitting/receiving unit 011 of the data source 01 receives an RF sleeping signal from the controller 00, and sends the sleeping signal to the first decoding/encoding unit 012. The unit 012 decodes the signal and transmits the decoded signal to the second micro-controller 013 for processing so as to implement the sleeping operation of the data source 01.

The second transmitting/receiving unit 021 of the playing device 02, upon receiving the RF sleeping signal, transmits the signal to the second decoding/encoding unit 022 to have the signal decoded therein. The decoded signal is then processed by the third micro-controller 023 to thereby carry out the sleeping operation of the playing device 02.

It should be understandable that the key panel of the on-vehicle audio/video system of the invention can also be provided with other function keys such as a fast-forward key, a fast-reverse key and a return key, etc., all of which have the same operations as those of the playing key or pause key.

A process of the RF control among the controller 00, the data source 01 and the playing device 02 of the on-vehicle audio/video system according to the invention will be described as follows, taking a Bluetooth RF transmission as an example.

The encoder 003 and the transmitter 004 of the controller 00 are set to be the first Bluetooth module (will be described in detail later). The first transmitting/receiving unit 011 and the first decoding/encoding unit 012 of the data source 01 are set to be the second Bluetooth module. Meanwhile, in order to enable the RF control of the playing device 02 by the data source 01, the second transmitting/receiving unit 021 and the second decoding/encoding unit 022 of the playing device 02 are set to be the third Bluetooth module.

Figure 2:
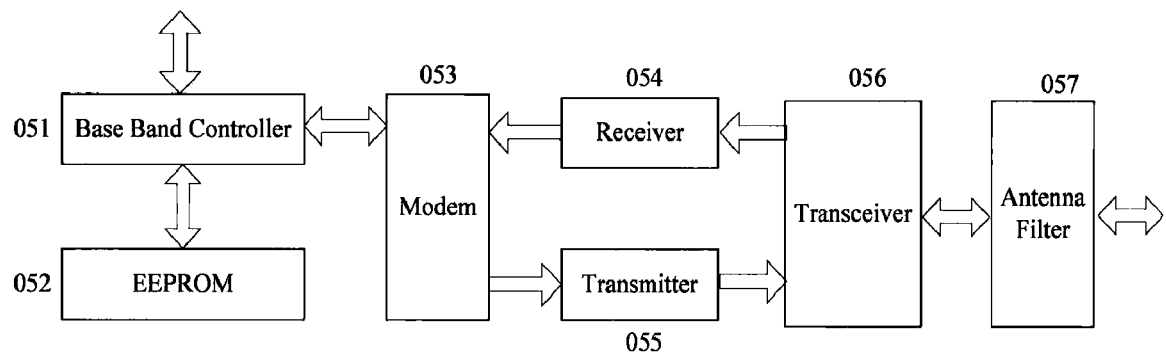
FIG. 2 is a schematic view illustrating the operation of an on-vehicle audio/video system according to an embodiment of the present invention.

As shown in FIG. 2, a Bluetooth module usually comprises a base band controller 051, an electrically erasable read-only memory (EEPROM) 052, a modem 053, a receiver 054, a transmitter 055, a transceiver controller 056 and an antenna filter 057.

The electrically erasable read-only memory 052 stores the Bluetooth firmware (not shown) and exchanges data, address and controlling signals with the base band controller 051. The Bluetooth firmware includes a link manager (not shown) and a host control interface (HCI) (not shown). The link manager implements the link management protocol (LMP) and is responsible for a link control of the base layer. Each Bluetooth device can conduct a point-to-point communication with the link manager of another Bluetooth device through LMP. The HCI provides an interface for accessing the base band controller 051, the link manager and a hardware-status-and-control register. The host controls a Bluetooth interface by using a series of instructions provided by the HCI driver. Upon receiving the instructions, the HCI of the Bluetooth firmware will create an event and return it to the host for indicating the change of the status in the interface.

The base band controller 051 processes link layer functions in the base layer, such as selection of the frequency modulation sequences, so as to exchange data between the host and the Bluetooth modules.

In an embodiment of the invention, the data transmission between the controller 00 and the data source 01 will be described to exemplify the RF control of the on-vehicle audio/video system according to the invention.

In this embodiment, the controller 00 is set as the host and the data source 01 as the servant. When a function key such as the wake-up key in the control panel 001 is pressed, the host, namely the controller 00, enters into the wake-up mode. The signal generator 002 generates a corresponding wake-up signal and transmits the signal in a certain manner to the Bluetooth module in the controller 00. The wake-up signal is received by the base band controller 051 of the Bluetooth module and is then modulated by the modem 053 by using Amplitude Shift Keying (ASK), Frequency Shift Keying (FSK), Phase Shift Keying (PSK), or the like. The modulated signal is transmitted by the transmitter 055 to the transceiver controller 056 which coordinates the transmitting and receiving of the signals, and then is sent out via the antenna filter 057. The second Bluetooth module of the data source 01 receives the RF wake-up signal and makes a response thereto. In the case where the data source 01 is powered on and is in a sleeping state, the received signal, after filtering the noise signal contained in the received signal by means of the antenna filter in the Bluetooth module, is sent to the modem through the transceiver controller and the receiver so that the signal is demodulated to remove the carrier. The demodulated signal is sent to the second micro-controller 013 in the data source 013 to be processed therein, thereby awaking the data source 01.

The playing device 02 receives the RF wake-up signal from the controller 00 simultaneously with the data source 01. The principle of operations in the playing device 02 in this connection is the same as that in the data source 01 when receiving the RF wake-up signal from the controller 00.

In the case where other function keys such as the playing key, pause key, stopping key or sleeping key are pressed, the principle of controlling through RF transmission among the controller 00, the data source 01 and the playing device 02 of the on-vehicle audio/video system according to the invention is essentially the same as that when the wake-up key is pressed.

While the embodiments of the invention have been described above, it should be noted that modifications and variations may be made thereto without deviating from the spirit of the invention. Thus, these modifications and variations should fall within the scope of the invention.

The invention claimed is:

1. An on-vehicle audio/video system comprising a controller, a data source and a playing device,
   wherein the controller comprises at least a first transmitter, the data source comprises at least a first receiver, a second micro-controller and a second transmitter, said controller is an radio frequency (RE) controller, the first transmitter is an RE transmitter; and said first receiver of said data source is an RF receiver,
   wherein said controller sends an RF control signal to the data source, said first RF receiver in the data source receives the RF control signal and sends the signal to the second micro-controller for processing, and said second transmitter transmits data signals and/or the control signal to said playing device under the control of said second micro-controller;
   wherein said data source further comprises a first decoding/encoding unit, and said playing device comprises a second decoding/encoding unit and a third micro-controller;
   wherein said first decoding/encoding unit is able to decode a first RE wake-up signal transmitted from the controller, the decoded first RE wake-up signal is transmitted to the second micro-controller so that the second micro-controller executes a wake-up operation of the data source according to the decoded first RE wake-up signal; and
   wherein said second decoding/encoding unit is able to decode a second RE wake-up signal transmitted from the controller, the decoded second RE wake-up signal is sent to the third micro-controller so that the third micro-controller executes a wake-up operation of the playing device according to the decoded second RE wake-up signal.

2. The system of claim 1, wherein said playing device further comprises at least an RE receiver adaptive to receive the RE control signal transmitted from the first RE transmitter of the controller.

3. The system of claim 2, wherein the signal transmissions between said data source and the playing device are carried out in an RF manner.

4. The system of claim 1, wherein the second transmitter of said data source is an RF transmitter.

5. The system of claim 1, wherein said data source is combined with said playing device, and the signals from the transmitter of the data source are cable signals.

6. The system of claim 1, wherein said data source uses a potable storage medium to store the data signals.

7. The system of claim 1, wherein said controller further comprises a key panel, a signal generator, and an encoder, and wherein said key panel receives external control instructions, said signal generator generates control signals corresponding to the external control instructions, and said encoder encodes and sends the control signals to the first transmitter.

8. The system of claim 1, wherein said controller is provided on the steer wheel.

9. The system of claim 1, wherein the controller comprises at least a first RF transmitter, the data source comprises at least a first RF receiver and a second RF transmitter, and the playing device comprises at least a second RF receiver.

10. The system of claim 2, wherein said data source uses a potable storage medium to store the data signals.

11. The system of claim 3, wherein said data source uses a potable storage medium to store the data signals.

12. The system of claim 5, wherein said data source uses a potable storage medium to store the data signals.

13. The system of claim 2, wherein said controller further comprises a key panel, a signal generator, and an encoder, and wherein said key panel receives external control instructions, said signal generator generates control signals corresponding to the external control instructions, and said encoder encodes and sends the control signals to the first transmitter.

14. The system of claim 3, wherein said controller further comprises a key panel, a signal generator, and an encoder, and wherein said key panel receives external control instructions, said signal generator generates control signals corresponding to the external control instructions, and said encoder encodes and sends the control signals to the first transmitter.

15. The system of claim 5, wherein said controller further comprises a key panel, a signal generator, and an encoder, and wherein said key panel receives external control instructions, said signal generator generates control signals corresponding to the external control instructions, and said encoder encodes and sends the control signals to the first transmitter.

16. The system of claim 2, wherein said controller is provided on the steer wheel.

17. The system of claim 3, wherein said controller is provided on the steer wheel.

18. The system of claim 5, wherein said controller is provided on the steer wheel.

* * * * *